United States Patent [19]

Fergason

[11] 4,435,047
[45] Mar. 6, 1984

[54] ENCAPSULATED LIQUID CRYSTAL AND METHOD

[75] Inventor: James L. Fergason, Kent, Ohio

[73] Assignee: Manchester R & D Partnership, Pepper Pike, Ohio

[21] Appl. No.: 302,780

[22] Filed: Sep. 16, 1981

[51] Int. Cl.³ .............................................. G02F 1/13
[52] U.S. Cl. .................................. 350/334; 350/349;
 350/350 R; 350/347 V; 428/1
[58] Field of Search .................... 252/316; 428/1;
 350/331 R, 334, 349, 350 R, 347 V, 340, 341

[56] References Cited

U.S. PATENT DOCUMENTS

| | | | |
|---|---|---|---|
| 3,341,466 | 9/1967 | Brynko et al. | 252/316 |
| 3,565,818 | 2/1971 | Bayless et al. | 252/316 |
| 3,578,482 | 5/1971 | Whitaker et al. | 252/316 X |
| 3,578,844 | 5/1971 | Churchill et al. | 252/316 X |
| 3,585,381 | 6/1971 | Hodson et al. | 428/1 X |
| 3,600,060 | 8/1971 | Churchill et al. | 428/1 X |
| 3,617,374 | 11/1971 | Hodson et al. | 428/1 |
| 3,697,297 | 10/1972 | Churchill et al. | |
| 3,720,623 | 3/1973 | Cartmell et al. | 350/350 R X |
| 3,787,110 | 1/1974 | Berreman et al. | 350/341 |
| 3,852,092 | 12/1974 | Patterson et al. | |
| 3,871,904 | 3/1975 | Haas et al. | |
| 3,872,050 | 3/1975 | Benton et al. | |
| 3,951,845 | 4/1976 | Cole | |
| 3,974,087 | 8/1976 | Gray et al. | 350/350 R X |
| 4,048,358 | 9/1977 | Shanks | |
| 4,077,260 | 3/1978 | Gray et al. | 350/350 S X |
| 4,161,557 | 7/1979 | Suzuki et al. | |
| 4,182,700 | 1/1980 | Benton et al. | |

FOREIGN PATENT DOCUMENTS

| | | |
|---|---|---|
| 2103591 | 8/1972 | Fed. Rep. of Germany . |
| 55-96922 | of 0000 | Japan . |
| 47-16098 | 8/1972 | Japan . |
| 49-96694 | 9/1974 | Japan . |
| 50-36993 | 10/1975 | Japan . |
| 51-30998 | 9/1976 | Japan . |
| 54-2580 | 5/1979 | Japan . |
| 54-31465 | 11/1979 | Japan . |
| 1161039 | 1/1968 | United Kingdom . |
| 1376926 | 11/1971 | United Kingdom . |

OTHER PUBLICATIONS

DeGennes, P. G. *The Physics of Liquid Crystals*, (Clarendon Press, Oxford 1974) pp. 215–220.
Proceedings of the IEEE, vol. 56, No. 12–John A. Van Raalte "Reflective Liquid Crystal Television Display".
J. Appl. Phys. vol. 45, No. 11 Nov. 1974, White & Taylor "New Absorptive Mode Reflective Liquid-Crystal Display Device".

Primary Examiner—John K. Corbin
Assistant Examiner—Richard F. Gallivan
Attorney, Agent, or Firm—Maky, Renner, Otto & Boisselle

[57] ABSTRACT

Briefly, according to one aspect of the invention, liquid crystal material, and especially nematic material, is encapsulated; according to another aspect the encapsulated liquid crystal material is used in liquid crystal devices, such as relatively large size visual display devices; and according to further aspects there are provided methods for encapsulating liquid crystal material and for making a liquid crystal device using such encapsulated liquid crystal material.

111 Claims, 7 Drawing Figures

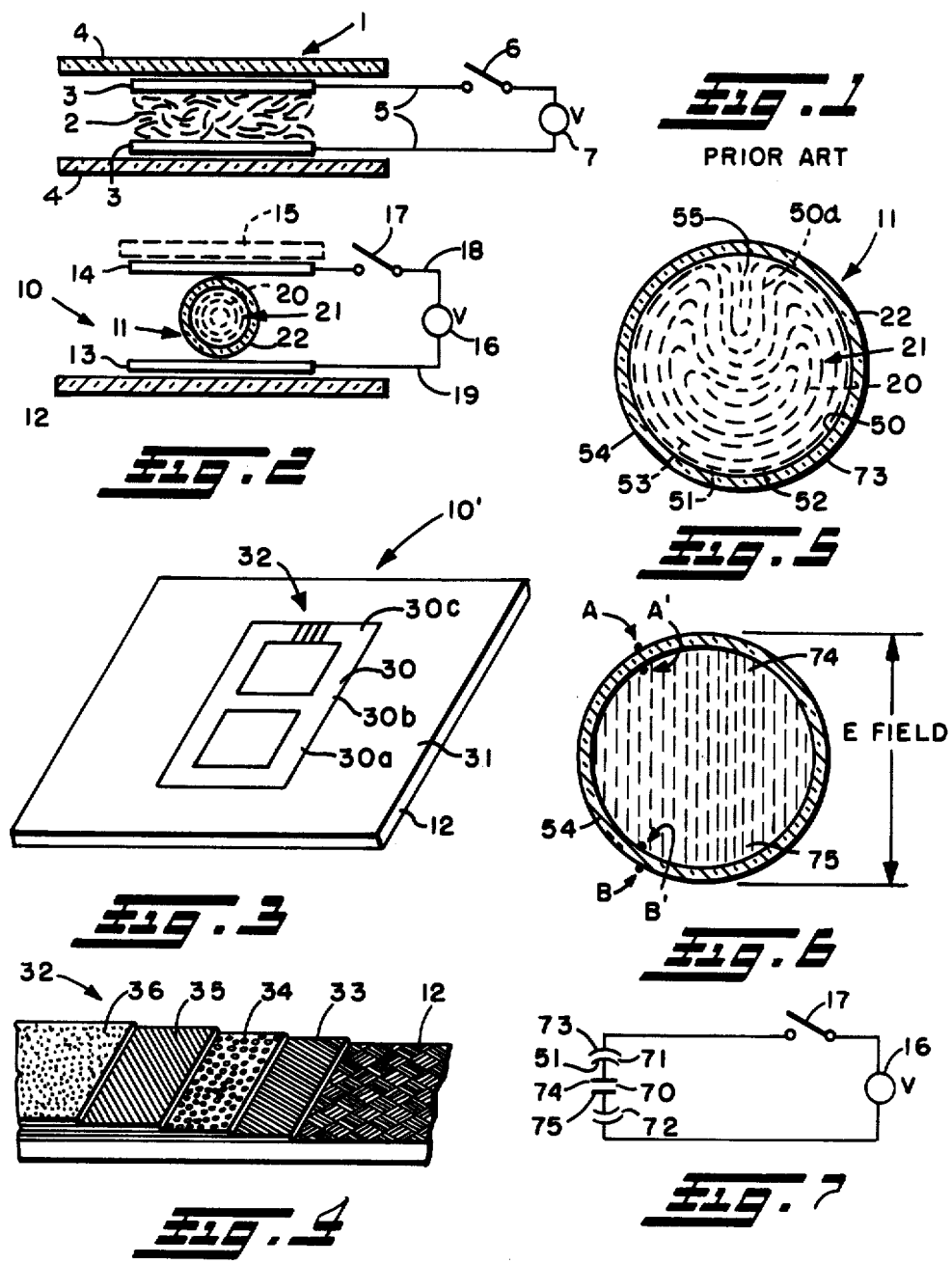

ENCAPSULATED LIQUID CRYSTAL AND METHOD

TECHNICAL FIELD

The present invention relates generally to liquid crystal and, more particularly, to encapsulated liquid crystal. Moreover, the invention relates to devices using such encapsulated liquid crystals and to method of making such encapsulated liquid crystals and devices.

BACKGROUND OF PRIOR ART

Liquid crystals currently are used in a wide variety of devices, including optical devices such as visual displays. Such devices usually require relatively low power and have satisfactory response time, provide reasonable contrast, and are relatively economical. The property of liquid crystals enabling use, for example, in visual displays, is the ability of liquid crystals to transmit light on one hand, and to scatter light and/or to absorb light, on the other, in dependence on whether the liquid crystals are in a relatively free, i.e. deenergized or field off state or in a strictly aligned, i.e. an energized or field on state, e.g. with an electric field applied across the liquid crystal material. An example of electrically responsive liquid crystal material and use thereof is provided in U.S. Pat. No. 3,322,485.

Certain liquid crystal material is responsive to temperature, changing optical characteristics in response to temperature of the liquid crystal material.

The invention of the present application is disclosed hereinafter particularly with reference to use of liquid crystal material that is particularly responsive to electric field.

Currently there are three categories of liquid crystal materials, namely cholesteric, nematic and smectic types. The invention of the present application relates in the preferred embodiment described below to use of nematic liquid crystal material or to a combination of nematic and some cholesteric type. However, various principles of the invention may be employed with various one or ones of the known types of liquid crystal material or combinations thereof. The various characteristics of the cholesteric, nematic and smectic types of liquid crystal material are described in the prior art. One known characteristic of liquid crystal material is that of reversibility; in particular it is noted here that nematic liquid crystal material is known to be reversibile, but cholosteric material is not reversible.

To enhance contrast and possibly other properties of liquid crystal material, pleochroic dyes have been mixed with the liquid crystal material to form a solution therewith. The molecules of pleochroic material generally align with the molecules of the liquid crystal material. Therefore, such pleochroic dyes will tend to function optically in a manner similar to that of the liquid crystal material in response to a changing parameter, such as application or non-application of an electric field. Examples of pleochroic dyes with liquid crystal material are described in U.S. Pat. Nos. 3,499,702 and 3,551,026.

An important characteristic of liquid crystal material is anisotropy. Anisotropic material has different physical properties in different directions. For example, liquid crystals may be optically anisotropic such that when the molecules are randomly oriented they permit light transmission and, when they are aligned due to application of an electric field thereacross, light may be transmitted through the liquid crystal material.

Liquid crystal material also has electrical anisotropy. For example, the dielectric constant for nematic liquid crystal material may be one value when the liquid crystal molecules are parallel to the electric field and may have a different value when the liquid crystal molecules are aligned perpendicular to an electric field. Since such dielectric value is a function of alignment, for example, reference to the same as a "dielectric coefficient" may be more apt than the usual "dielectric constant" label. Similar properties are true for other types of liquid crystals.

Some brief discussion of encapsulation of cholesteric liquid crystal material is presented in U.S. Pat. Nos. 3,720,623, 3,341,466, and 2,800,457, the latter two patents being referred to in the former patent.

In the past devices using liquid crystals, such as visual display devices or other devices, have been of relatively small size. Large size devices using liquid crystals, such as, for example, a billboard display or a sign have not been able to be made satisfactorily for a number of reasons. One reason is the fluidity of the liquid crystals, (the liquid crystal material may tend to flow creating areas of the display that have different thicknesses). As a result, the optical characteristics of the display may lack uniformity, have varying contrast characteristics at different portions of the display, etc; the thickness variations cause variations or gradations in optical properties of the liquid crystal device. Moreover, the varying thickness of the liquid crystal material will cause corresponding variations in the electrical properties of the liquid crystal material, such as capacitance and impedance. further reducing uniformity of a large size liquid crystal device. The varying electrical properties of the liquid crystal material, then, also may cause a corresponding variation in the effective electric field applied across the liquid crystal material and/or in response to a constant electric field would respond differently at areas of the liquid crystal that are of different thickness.

A pleochroic display, i.e. one in which pleocroic dye and liquid crystal material are in solution, has the advantage of not requiring a polarizer. However, such a pleochroic device has a disadvantage of relatively low contrast when used directly in the nematic form. It was discovered in the past, though, that a cholesteric liquid crystal material could be added to the nematic one together with the dye to improve the contrast ratio. See White et al. article "Journal of Applied Physics," Volume 45, No. 11, November 1974, at pages 4718–4723, for example. The cholesteric material would tend not to return to its original zero field form when the electric field is removed.

Another problem encountered with pleochroic dye included in solution with liquid crystal material, regardless of the particular type of liquid crystal material, is that the absorbtion of the dye is not zero in the field-on condition; rather such absorbtion in the field-on condition follows a so-called ordering parameter, which relates to or is a function of the relative alignment of the dyes. The optical transmission characteristic of liquid crystal material is an exponential function of thickness of the liquid crystal material; specifically, the on state or field-on or energized state of the liquid crystal material is an exponential function of thickness of the liquid crystal material, and the absorbing state or off state also is a different exponential function of thickness.

To overcome those problems described in the two immediately preceding paragraphs, the liquid crystal material should have an optimum uniform thickness. (As used herein liquid crystal material means tthe liquid crystals themselves and, depending on context, the pleochroic dye in solution therewith.) There also should be an optimum spacing of the electrodes by which the electric field is applied to the liquid crystal material. To maintain such optimum thickness and spacing, rather close tolerances must be maintained. To maintain close tolerances, there is a limit as to the size of the device using such liquid crystals, for it is quite difficult to maintain close tolerances over large surface areas, for example.

BRIEF SUMMARY OF INVENTION

Briefly, according to one aspect of the invention, liquid crystal material, and especially nematic material, is encapsulated; according to another aspect the encapsulated liquid crystal material is used in liquid crystal devices, such as relatively large size visual display devices; and according to further aspects there are provided methods for encapsulating liquid crystal material and for making a liquid crystal device using such encapsulated liquid crystal material.

Some terms used herein generally are defined as follows: liquid crystal material broadly refers to any type of liquid crystal material that will work in the context of the present invention, but preferably refers to nematic type. Such liquid crystal material also may include pleochroic dye or other ingredient. A capsule refers to a containment device or medium that confines a quantity of liquid cystal material, and encapsulating medium or material is that medium or material of which such capsules are formed. An encapsulated liquid crystal or encapsulated liquid crystal material means a quantity of liquid crystal material confined or contained in the encapsulating medium, such as the noted capsules. A liquid crystal device is a device formed of liquid crystal material, in the present invention such devices are formed of encapsulated liquid crystals capable of providing a function of the type typically inuring to liquid crystal material; for example, such a liquid crystal device may be a visual display that in response to application and removal of an electric field effects a selected attenuation of visible light.

One method of making encapsulated crystals includes mixing together liquid crystal material and an encapsulating medium in which the liquid crystal material will not dissolve and permitting formation of discrete capsules containing the liquid crystal material.

A method of making a liquid crystal device including such encapsulated liquid crystal includes, for example applying such encapsulated liquid crystal material to a substrate. Moreover, such method may include providing means for applying an electric field to the liquid crystal material to affect a property thereof.

According to another feature of the invention a nematic material with positive dielectric anisotropy in which is dissolved a pleochroic dye is placed in a generally spherical capsule. The capsule wall distorts the liquid crystal molecules so they and the dye when no field is applied will tend to absorb all directions of polarized light. When a suitable electtric field is applied across such a capsule, for example across an axis thereof, the liquid crystal material will tend to align parallel to such field causing the absorbtion characteristic of such material to be reduced to one assumed when the liquid crystal material is in planar configuration. To help assure that adequate electric field is applied across the liquid crystal material in the capsule, and not just across or through the encapsulating medium, and, in fact, with a minimum voltage drop across the wall thickness of the respective capsules, the encapsulating material should have a dielectric constant near to that of the liquid crystal material, on the one hand, and a relatively large impedance, on the other hand, and the liquid crystal material itself should have a positive dielectric anisotropy.

Contrast of a liquid crystal device employing encapsulated liquid crystals may be improved by selecting an encapsulating medium that has an index of refraction that is matched to the ordinary index of refraction of the liquid crystal material. The encapsulating medium may be used not only to encapsulate liquid crystal material but also to adhere the capsules to a substrate for support thereon. Alternatively, a further binding medium may be used to hold the liquid crystal capsules relative to a substrate. In the latter case, though, preferably the additional binding medium has an index of refraction which is matched to that of the encapsulating medium for maintaining the improved contrast characteristic described above.

A feature of the spherical or otherwise curved capsule which confines the liquid crystal material therein in accordance with the present invention is that the liquid crystal material tends to follow the curvature or otherwise to align generally parallel with the curved surfaces of such capsule. Accordingly, the individual liquid crystal molecules tend to be forced or distorted to a specific form, being folded back on themselves in a sense as they follow the capsule wall, so that the resulting optical characteristic of a given capsule containing liquid crystal material is such that substantially all light delivered thereto will be absorbed when no electric field is applied, regardless of the polarization direction of the incident light. Even without dye this effect causes scattering and thus opacity.

Another feature is the ability to control the effective thickness of the liquid crystal material contained in a capsule by controlling the internal diameter of such capsule. Such diameter control may be effected by a separation process during the method of making the encapsulated liquid crystals using any one of a variety of conventional or novel sorting techniques as well as by controlling the mixing process, the quantities of ingredients, and/or the nature of the ingredients provided during mixing. By controlling such thickness parameter to relatively close tolerances, then, the subsequent tolerance requirements when the final liquid crystal device is made using the encapsulated liquid crystals will not be as critical as was required in the past.

Moreover, a further and very significant feature of the present invention is that there appears to be no limitation on the size of a high quality liquid crystal device that can be made using the encapsulated liquid crystals in accordance with the present invention. More specifically, by providing confinement for discrete quantities of liquid crystal material, for example, in the described capsules, the various problems encountered in the past that prevented use of liquid crystal material in large size devices are overcome, for each individual capsule in effect can still operate as an independent liquid crystal device. Moreover, each capsule, then, preferably has physical properties enabling it to be mounted in virtually any environment including one containing a plurality of further such liquid crystal capsules mounted to a substrate or otherwise supported for use in response to application and removal of some type of excitation source, such as, for example, an electric field or the like.

Important considerations in accordance with the invention, and the discovery of the inventor, are that an encapsulating medium having electrical properties matched in a prescribed way to the electrical properties of liquid crystal material encapsulated thereby and additionally preferably optically matched to optical properties of such liquid crystal material permits efficient and high quality functioning of the liquid crystal material in response to excitation or non-excitation by an external source; and that the interaction of the encapsulating medium with the liquid crystal material distorts the latter in a prescribed manner changing an operational mode of liquid crystal material. Regarding the latter, by forcing the liquid crystal molecules to distort into generally parallel or conforming alignment with the capsule wall, the liquid crystals will absorb or block, rather than transmit, light when not subject to an electric field and will be functional with respect to all manners of incident light regardless of the direction of polarization of such incident light.

With the foregoing in mind, a primary object of the invention is to enable the use of liquid crystal material over relatively large surfaces, and especially to effect the same while maintaining relatively high quality of operation, controlled uniformity of output and satisfactory contrast.

Another primary object is to confine liquid crystal material while maintaining optical characteristics of such material, and especially to effect the same also maintaining electrical responsiveness of the liquid crystal material.

An additional primary object is to encapsulate nematic liquid crystal material in a non-interacting medium.

A further primary object is to achieve a useful encapsulation of nematic liquid crystal material.

Still another primary object is to utilize both physical e.g. alignment, and optical, e.g. index of refraction, characteristics of material of the liquid crystal type.

Still an additional primary object is to utilize resin material for encapsulating liquid crystal material, and especially to effect the same to form curved and most preferably spherical capsules containing discrete quantities of liquid crystal material.

Still a furher primary object is to eliminate restrictions on size of displays or other devices of the liquid crystal type, especially while achieving high quality operation, satisfactory contrast, wide viewing angle and adequate response time.

Even another primary object is to force a liquid crystal material to its zero field form, particularly when such material includes a combination of liquid crystal material and pleochroic dye material and even when the liquid crystal material includes more than one type of liquid crystal material.

Another object is to enable use of nematic liquid crystal material with pleochroic dye in solution therewith while obtaining an effect of having cholesteric material added thereto even without the latter. More specifically, an object is to enable liquid crystal material that contains pleochroic dye to absorb light in all directions and to minimize partial light transmission when in field off conditions, i.e. when no electric field is applied to the liquid crystal material.

An additional object is to distort the internal structure of liquid crystal material to achieve enhanced optical properties.

A further object is to achieve controlled light distrotion and especially such controlled distortion of light entering liquid crystal material that is contoured in an encapsulating medium.

Still another object is to provide a uniform area over which a constant and uniform electric field may be delivered to discrete quantities of liquid crystal material and especially when such material is contained in discrete capsules.

Still an additional object is to control the size of the electric field required to operate the liquid crystal device.

Still a further object is to improve the uniformity of turn on or operation of a liquid crystal device, and especially to facilitate the control of such turn on or operation.

Yet another object is to control the uniformity of the size and/or other dimensional characteristics of liquid crystal capsules.

Yet an additional object is to encapsulate liquid crystal material in a resin or other material and most preferably to effect such encapsulation while forming discrete capsules containing liquid crystal material.

Yet a further object is to use a single medium for encapsulating liquid crystal material in discrete capsules or the like and for binding the capsules together and/or a support substrate or the like.

Yet still another object is to use an optically anisotropic liquid crystal in a limited optically isotropic manner, e.g. by causing a polarization direction sensitive liquid crystal material to eliminate such sensitivity.

Yet still an additional object is to impose elastic energy on liquid crystal material, and especially to effect the same to cause unusual properties in such liquid crystal material.

Yet even another object is physically to control the ease of alignment of liquid crystals.

Yet even an addition object is to facilitate applying liquid crystal material to a substrate.

Yet even a further object is to facilitate interfacing or applying of electrodes with respect to liquid crystal type material.

Another object is to apply electrodes directly to liquid crystal material.

An additional object is to improve a method for making liquid crystal devices, especially by encapsulating the liquid crystal materials.

A further object is to control the requirements of voltage or electric field required to operate a liquid crystal device.

Moreover another object is to stop scattering or absorbtion by liquid crystal material when an electric field is applied thereto.

Moreover an additional object is to control the amount of voltage drop that occurs across liquid crystal material.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF DRAWING

In the annexed drawing:

FIG. 1 is a schematic representation of a prior art liquid crystal device;

FIG. 2 is a schematic representation of a liquid crystal device in accordance with the present invention;

FIG. 3 is an isometric view of a liquid crystal display device in accordance with the present invention;

FIG. 4 is an enlarged fragmentary view, partly broken away, of a portion of the liquid crystal display device of FIG. 3;

FIG. 5 is an enlarged schematic illustration of a liquid crystal capsule in accordance with the present invention under a no field condition;

FIG. 6 is a view similar to FIG. 5 under an applied electric field condition; and FIG. 7 is a schematic electric circuit diagram representation of the capsule with an applied field.

SUMMARY OF PRIOR ART LIQUID CRYSTAL DEVICE

Referring now in detail to the drawings, wherein like reference numerals designate like parts in the several figures, and initially to FIG. 1, a prior art liquid crystal device is generally indicated at 1. Such device 1 includes liquid crystal material 2 sandwiched between electrodes 3 of, for example, indium tin oxide that are deposited for support on respective mounting or confining substrates 4, such as glass, plastic sheets or the like. The sheets 4 may be clear as may be the electrodes 3 so that the device 1 is an optical transmission control device, whereby incident light may be scattered when no electric field is applied by the electrodes 3 across a liquid crystal material 2 and the incident light may be transmitted through the liquid crystal material 2 when an electric field is applied thereacross. Electric leads 5 and switch 6 selectively couple voltage source 7 across the electrodes 3 to provide such electric field. The voltage source 7 may be either an AC or a DC voltage source.

The liquid crystal material 2, and specifically the individual molecules thereof, in the device 1 are somewhat confined by the substrates 4 for retention in a desired location, say for example, to be used overall as part of a digital display device. On the other hand, the liquid crystal material 2, and specifically the individual molecules thereof, must have adequate freedom of movement so that they may assume either a random orientation or distribution when no electric field is applied or a prescribed distributional or orientational alignment when an electric field is applied across the electrodes 3. If desired, one of the substrates 4 may be reflective to reflect incident light received through the liquid crystal material 2 back through the latter for delivery through the other substrate 4 for subsequent use. The various principles of operation and features and disadvantages of the liquid crystal device 1 are summarized above and are described in the prior art literature.

The liquid crystal material 2 may be of virtually any type that is responsive to an electric field applied thereacross so as to have a desired operating characteristic intended for the device 1; the liquid crystal material 2 also may include, if desired, pleochroic dye material in solution therewith.

DESCRIPTION OF THE PREFERRED EMBODIMENT

Turning now of FIG. 2, an improved liquid crystal device in accordance with the present invention is indicated at 10. The device 10 includes an encapsulated liquid crystal 11 which is supported from a mounting substrate 12 across which an electric field may be applied via electrodes 13, 14.

The electrode 13 may be, for example, a quantity of vacuum deposited indium tin oxide applied to the substrate 12, and the electrode 14 may be, for example, electrically conductive ink. A protective layer or coating 15 may be applied over the electrode 14 for protective purposes but such layer 15 ordinarily would not be necessary for supporting or confining the encapsulated liquid crystal 11 or the electrode 14. Voltage may be applied to the electrodes 13, 14 from an AC or DC voltage source 16, selectively closable switch 17, and electrical leads 18, 19 in turn to apply an electric field across the encapsulated liquid crystal 11 when the switch 17 is closed.

The encapsulated liquid crystal 11 includes liquid crystal material 20 contained within the confines or interior volume 21 of a capsule 22. According to the preferred embodiment and the best mode of the present invention, the capsule 22 is generally spherical. However, the principles of the invention would apply when the capsule 22 is of a shape other than spherical; such shape should provide the desired optical and electrical characteristics that will satisfactorily coexist with the optical characteristics of the liquid crystal 20, e.g. index of refraction, and will permit an adequate portion of the electric field to occur across the liquid crystal material 20 itself for effecting desired alignment of the liquid crystal molecules when it is desired to have a field on condition. A particular advantage to the preferred spherical configuration of the capsule 22 will be described below with respect to the distortion it effects on the liquid crystal molecules.

The mounting substrate 12 and the electrodes 13, 14 as well as the protective coating 15 may be optically transmissive so that the liquid crystal device 10 is capable of controlling transmission of light therethrough in response to whether or not an electric field is applied across the electrodes 13, 14 and, thus, across the encapsulated liquid crystal 11. Alternatively, the mounting substrate 12 may be optically reflective or may have thereon an optically reflective coating so that reflection by such reflective coating of incident light received through the protective coating 15 will be a function of whether or not there is an electric field applied across the encapsulated liquid crystal 11.

According to the preferred embodiment and best mode of the invention a plurality of encapsulated liquid crystals 11 would be applied to the mounting substrate 12 in a manner such that the encapsulated liquid crystals adhere to the mounting substrate 12 or to an interface material, such as the electrode 13, for support by the mounting substrate 12 and retention in position fixed relative to the other encapsulated liquid crystals 11. Most preferably the encapsulating medium of which the capsule 22 is formed is also suitable for binding or otherwise adhering the capsule 22 to the substrate 12. Alternatively, a further binding medium (not shown) may be used to adhere the encapsulated liquid crystals 11 to the substrate 12. Since the capsules 22 are adhered to the substrate 12, and since each capsule 22 provides the needed confinement for the liquid crystal material 20, a second mounting substrate, such as the additional one shown in the prior art liquid crystal device 1 of FIG. 1, ordinarily should be unnecessary. However, for the purpose of providing protection from scarring, electrochemical deterioration, e.g. oxidation, or the like, of the electrode 14, the protective coating 15 may be provided on the side or surface of the liquid crystal device 10 opposite the mounting substrate 12, the latter providing he desired physical protection on its own side of the device 10.

Since the encapsulated liquid crystals 11 are relatively securely adhered to the substrate 12 and since there ordinarily would be no need for an additional substrate, as was mentioned above, the electrode 14 may be applied directly to the encapsulated liquid crystals 11.

Turning now to FIG. 3, an example of a liquid crystal device 10' accordance with the invention is shown in the form of a liquid crystal display device, which appears as a square cornered figure eight 30 on the substrate 12, which in this case preferably is a plastic material, such as Mylar, or may alternatively be another material, such as glass, for example. The shaded area appearing in FIG. 3 to form the square cornered figure eight is formed of plural encapsulated liquid crystals 11 arranged in one or more layers on and adhered to the substrate 12.

An enlarged framentary section view of a portion 32 of the figure eight 30 and substrate 12 is illustrated in FIG. 4. As is seen in FIG. 4, on the surface 31 of the substrate 12, which may be approximately 10 mils thick, is deposited a 200 angstrom thick electrode layer 33 of indium tin oxide. One or more layers 34 of plural encapsulated liquid crystals 11 are applied and adhered directly to the electrode layer 33. Such adherence according to the preferred embodiment and best mode is effected by the encapsulating medium that forms respective capsules 22, although, if desired, as was mentioned above, an additional adhering or binding material may be used for such adherence purposes. The thickness of the layer 34 may be, for example, approximately 1 mil. A further electrode layer 35 is deposited on the layer 34 either directly to the material of which the capsules 22 are formed or, alternatively, to the additional binding material used to bind the individual encapsulated liquid crystals 11 to each other and to the mounting substrate 12. The electrode layer 35 may be, for example, approximately ½ mil thick and may be formed, for example, of electrically conductive ink. A protective coating layer 36 for the purposes described above with respect to the coating 15 in FIG. 3 also may be provided as is shown in FIG. 4.

In a conventional visual display device either of the liquid crystal or light emitting diode type, the figure eight element 30 ordinarily would be divided into seven electrically isolated segments, each of which may be selectively energized or not so as to create various numeral characters. For example, energization of the segments 30a and 30b would display the numeral "1" and energization of the segments 30a, 30b, 30c would display the numeral "7".

A feature of the present invention utilizing the encapsulated liquid crystals 11 is that a versatile substrate 12 can be created to be capable of displaying virtually any desired display as a function of only the selective segments of conductive ink electrodes printed on the liquid crystal material. In this case, the entire surface 31 of the substrate 12 may be coated with electrode material 33, and even the entire surface of that electrode material may be coated substantially contiguously with layer 34 of encapsulated liquid crystals 11. Thereafter, a prescribed pattern of electrode segments of conductive ink 35 may be printed where desired on the layer 34. A single electrical lead may attach the surface 31 to a voltage source, and respective electrical leads may couple the respective conductive ink segments via respective controlled switches to such voltage source. Alternatively, the encapsulated liquid crystals 11 and/or the electrode material 33 may be applied to the surface 31 only at those areas where display segments are desired.

Although a detailed description of operation of the individual encapsulated liquid crystals 11 will be presented below, it will suffice here to note that the encapsulated liquid crystals in the layer 34 function to attenuate or not to attenuate light incident thereon in dependence on whether or not an electric field is applied thereacross. Such an electric field may be, for example, one produced as a result of coupling of the electrode layer portions 33, 35 at an individual segment, such as segment 30a, of the liquid crystal device 10' to an electrical voltage source. The magnitude of the electric field required to switch the encapsulated liquid crystals 11 from a no field (deenergized) condition to a field on (energized) condition may be a function of several parameters, including, for example, the thickness of the layer 34, which in turn may depend on the diameter of individual capsules 22 and the number of such capsules in the thickness direction of layer 34. Importantly, it will be appreciated that since the liquid crystal material 20 is confined in respective capsules 22 and since the individual encapsulated liquid crystals 11 are secured to the substrate 12, the size of the liquid crystal device 10' or any other liquid crystal device employing encapsulated liquid crystals in accordance with the present invention is nearly unlimited. Of course, at those areas where it is intended to effect a change in the optical properties of the encapsulated liquid crystals of such a device in response to a no field or field on condition, it would be necessary to have there electrodes or other means for applying to such liquid crystals a suitable electric field.

The electrode layer 33 may be applied to the substrate 12 by evaporation, by vacuum deposition, by sputtering, by printing or by any other technique that may be desired. Moreover, the layer 34 of encapsulated liquid crystals 11 may be applied, for example, by a web or gravure roller or by reverse roller printing techniques. The electrode layer 35 also may be applied by various printing, stenciling or other techniques. If desired, the electrode layer 33 may be prepared as a full coating of the substrate 12, such as Mylar, as was described above, as part of the process in which the Mylar sheet material is manufactured, and the layer 34 also may be applied as part of such manufacturing process.

The ability to make and to use successfully liquid crystal devices of the type just described using encapsulated liquid crystals is due to the ability to make encapsulated liquid crystals and to the properties of such encapsulated liquid crystals, both of which are features of the present invention. These features now will be described with reference to FIGS. 5, 6 and 7 in particular.

Referring specifically to FIG. 5, the capsule 22 has a generally smooth curved interior wall surface 50 defining the boundary of the volume 21. The actual dimensional parameters of the wall surface 50 and of the overall capsule 22 are related to the quantity of liquid crystal material 20 contained therein and to the size of the individual liquid crystal molecules. Additionally, the capsule 22 applies a force to the liquid crystals 20 tending to pressurize or at least to maintain substantially constant the pressure within the volume 21. As a result of the foregoing, and due to the surface wetting nature of the liquid crystal molecules, such molecules, which ordinarily in free form would tend to be straight, although perhaps randomly distributed, are distorted to curve in a direction that generally is parallel to a relatively proximate portion of the interior wall surface 50. Due to such distortion the liquid crystals store elastic energy. For simplicity of illustration, and for facility of comprehending the foregoing concept, a layer 51 of liquid crystal molecules represented by respective dashed lines 52 is shown in closest proximity to the interior wall surface 50. The molecules 52 are distorted to curve in the direction that is parallel to a proximate area of the wall surface 50. Other layers, such as layer 53, etc., of liquid crystal molecules 52 are shown in the capsule 22. The liquid crystal molecules are shown in such layers, although it will be appreciated that the liquid crystal molecules may be oriented somewhat more randomly than in the ordered layers illustrated in FIG. 5; however, such molecules nevertheless will tend to align with some degree of parallel relationship to the respective proximate areas of the interior wall surface 50.

In the preferred embodiment and best mode of the present invention the liquid crystal molecules 52 are of the nematic type. Such molecules usually assume a straight line thread-like configuration, and a liquid crystal material comprised of such nematic molecules usually is optical polarization direction sensitive. However, since the molecules 52 in the encapsulated liquid crystal 11 are distorted or forced to curved form in the full three dimensions of the capsule 22, such nematic liquid crystal material in such capsule takes on an improved characteristic of being insensitive to the direction of optical polarization of light incident thereon. The inventor has discovered, moreover, that when the liquid crystal material 20 in the capsule 22 has pleochroic dye dissolved therein, such dye, which ordinarily also would be expected to have optical polarization sensitivity, no longer is polarization sensitive because the dye tends to follow the same kind of curvature orientation or distortion as that of the individual liquid crystal molecules 52.

It is noted here that the liquid crystal material 20 in the capsule 22 has a discontinuity 55 in the generally spherical orientation thereof. Such discontinuity is caused by the incapability of the liquid crystal to align uniformly in a manner compatible with parallel alignment with the wall 54 and a requirement for minimum elastic energy. The liquid crystal molecules 52, though, will tend to follow around the discontinuity in the manner shown in planar form in FIG. 5, but in reality in three dimensions, following a pattern along the three dimensional generally cylindrical internal boundary wall surface 50a of the protruding discontinuity 55. Such discontinuity further distorts the liquid crystal molecules which futher decreases the possibility that the liquid crystal material 20 would be sensitive to optical polarization direction of incident light.

With the individual liquid crystal molecules 52 being distorted to fold in on themselves generally in the manner illustrated in FIG. 5, the encapsulated liquid crystal 11 ordinarily will absorb or block light from being transmitted therethrough when no electric field is applied across the encapsulated liquid crystal 11 and particularly across the liquid crystal material 20 thereof.

However, when an electric field is applied across the encapsulated liquid crystal 11 in the manner illustrated in FIG. 6, the liquid crystal molecules 52 and any pleochroic dye in solution therewith will align in response to the electric field in the manner shown in such figure. Such alignment permits light to be transmitted through the encapsulated liquid crystal 11, for example as described above with reference to FIGS. 2, 3 and 4.

In the field off condition since the liquid crystal molecules 52 are distorted to curved form, they have a certain elastic energy. Such elastic energy causes the crystals to function doing things that otherwise were not possible when the liquid crystal molecules assume their ordinary linear form. For example, the discontinuity protrusion 55 would tend to cause scattering and absorbtion within the capsule, and the tangential or parallel alignment of the liquid crystal molecules to respective portions of interior wall surface 50 both cause scattering and absorption within the capsule 22. On the other hand, when the electric field is applied in the manner illustrated in FIG. 6, not only do the liquid crystal molecules 52 align as shown, but also the discontinuity 55 tends to align in parallel with the electric field. Accordingly, such discontinuity will have a minimum effect on optical transmission when the encapsulated liquid crystal 11 is in a field on condition.

To optimize contrast characteristics of a liquid crystal device, such as that shown at 10' in FIG. 3, comprised of encapsulated liquid crystals 11, and, more particularly, to avoid optical distortion due to refraction of incident light passing from the encapsulating medium into the liquid crystal material and vice versa of the encapsulated liquid crystal 11 of FIG. 6, the index of refraction of the encapsulating medium and the ordinary index of refraction of the liquid crystal material should be matched to be as much as possible the same.

However, when no field is applied there will be a difference in indices of refraction at the boundary of the liquid crystal and capsule wall due to the extraordinary index of refraction of the liquid crystal being greater than the encapsulating medium. This causes refraction at that interface or boundary and thus further scattering and is a reason why the invention of encapsulated nematic liquid crystal material, in particular, will function to prevent transmission of light even without the use of pleochroic dye.

Ordinarily the encapsulated liquid crystals 11 would be applied to the substrate 12 (FIG. 3) such that the individual encapsulated liquid crystals 11 are relatively randomly oriented and preferably several capsules thick to assure an adequate quantity of liquid crystal material on the surface 31 of the substrate to provide the desired level of light blockage and/or transmission characteristics for, for example, a liquid crystal device 10' or the like.

In a liquid crystal device, such as that shown in 10' in FIG. 3, which is comprised of liquid crystal material 20 including pleochroic dye to form encapsulated liquid crystals 11 according to the invention, it has been discovered that the degree of optical absorbency relatively free is at least about the same as that of (unencapsulated) liquid crystal material including pleochroic dye, such as that shown in FIG. 1. It also has been discovered unexpectedly that when the electric field is applied in the manner illustrated in FIG. 6, for example, the clarity or lack of opaqueness of the encapsulated liquid crystal material 20 including pleochroic dye is at least about the same as that of the ordinary case in the prior art device 1 having dye in solution with the relatively free liquid crystal material.

It is important that electrical field E shown in FIG. 6 is applied to the liquid crystal material 20 in the capsule 22 for the most part rather than being dissipated or dropped substantially in the encapsulating material of which the capsule itself is formed. In other words, it is important that there not be a substantial voltage drop across or through the material of which the wall 54 of the capsule 22 is formed; rather, the voltage drop should occur across the liquid crystal material 20 within the volume 21 of the capsule 22.

The electrical impedance of the encapsulating medium preferably should be larger than that of the liquid crystal material in the encapsulated liquid crystal 11 (FIG. 6) and also should be large enough that a short circuit will not occur exclusively through the wall 54 bypassing the liquid crystal material. Therefore, for example, the impedance to current flow through or via the wall 54, say from point A to point B (this may be considered, for example, the impedance of only the encapsulating or containment medium in an electrical path substantially directly from one electrode, exclusively through such medium, and to the other electrode, as can be seen, say, in FIGS. 2, 4 and 6), would be rather substantial as opposed to the impedance that would be encountered in a current path directly from point A to point A' inside the interior wall surface 50, directly through the liquid crystal material 20 to point B' still within the volume 21, ultimately to point B again (this may be considered, for example, the lumped impedance of the liquid crystal material and the smaller amount of medium, i.e. relative to the larger amount of medium in the aforementioned direct A-B path exclusively through the medium, in an electrical path directly from one electrode, through medium, e.g. on side of a capsule wall, through the liquid crystal material, through medium again, e.g. the diametrically opposite side of the capsule wall, and to the electrode, as can be seen, say, in FIGS. 2, 4 and 6.). Thus, referring to FIGS. 2, 4 and 6 the electrical path through only one medium may be referred to as the medium path or A-B path; the electrical path through only liquid crystal material may be referred to as the liquid crystal path or A'-B' path; the electrical path through the thinner medium portions primarily between liquid crystal material and the electrodes, e.g. the capsule wall, may be referred to as the wall thickness path or A-A' or B-B' path; and the electrical path between electrodes and through both medium and liquid crystal material may be referred to as the lumped impedance path or the A-A'-B'-B path.

The dielectric constants (coefficients) of the material of which the encapsulating medium is formed and of which the liquid crystal material is comprised and the effective capacitance values of the capsule wall 54 particularly in a radial direction and of the liquid crystal material across which the electric field E is imposed all should be so related that the wall 54 of the capsule 22 does not substantially drop the magnitude of the applied electric field E.

A schematic electric circuit diagram representing the circuit across which the electric field E of FIG. 6 is imposed is illustrated in FIG. 7. The electric field is derived from the voltage source 16 when the switch 17 is closed. A capacitor 70 represents the capacitance of the liquid crystal material 20 in the encapsulated liquid crystal 11 when such electric field is applied in the manner illustrated in FIG. 6. The capacitor 71 represents the capacitance of the capsule 22 wall 54 at an upper area (the direction conveniently referring to the drawing but having no other particular intentional meaning) and is, accordingly, curved in a manner similar to that of the upper portion of the capsule 22 of FIGS. 5 and 6. The capacitor 72 similarly represents the capacitance of the lower portion of the capsule exposed to the electric field E. The magnitudes of capacitance for each capacitor 70-72 will be a function of the dielectric constant (coefficient) of the material of which the respective capacitors are formed and of the spacing of the effective plates thereof. It is desirable that the capacitors 71, 72 be larger in magnitude than the capacitor 70 so that the voltage drop occurring across the respective capacitors 71, 72 will be less than the voltage drop across the capacitor 70; the result, then, is application of a maximum portion of the electric field E across the liquid crystal material 20 in the encapsulated liquid crystal 11 for achieving optimized operation, i.e. alignment, of the liquid crystal molecules thereof with a minimum total energy requirement of the voltage source 16.

In connection with capacitor 71, for example, the dielectric material is that of which the wall 54 is formed relatively near the upper portion of the capsule 22. The effective plates of such capacitor 71 are the exterior and interior wall surfaces 73, 51, and the same is true for the capacitor 72 at the lower portion of the capsule 22 relative to the illustration of FIG. 6, for example. By making the wall 54 as thin as possible, while still providing adequate strength for containment of the liquid crystal material 20 in the volume 21, the magnitudes of capacitors 71, 72 can be maximized, this especially in comparison to the rather thick or lengthy distance between the upper portion 74 of the liquid crystal material 20 of the lower portion 75 thereof which approximately or equivalently form the plates of the same number of the capacitor 70.

The liquid crystal material 20 will have a dielectric constant (coefficient) value that is anisotropic. It is preferable that the dielectric constant of the wall 54 be no lower than the lower dielectric constant (coefficient) of the anisotropic liquid crystal material 20 to help meet the above conditions.

The encapsulated liquid crystal 11 has features that since the liquid crystal molecules 52 are distorted and since the pleochroic dye similarly is distorted, absorbency or blockage of light transmission through the encapsulated liquid crystals will be highly effective when no electric field E is applied thereacross. On the other hand, due both to the efficient application of electric field across the liquid crystal material 20 in the encapsulated liquid crystals 11 to align the liquid crystal molecules and the dye along therewith as well as the above described preferred index of refraction matching, i.e. of the encapsulating medium and of the liquid crystal material, so that incident light will not be refracted or bent at the interface between the capsule wall 54 and the liquid crystal material 20, when an electric field is applied the encapsulated liquid crystal 11 will have a good optically transmissive characteristic.

Since a plurality of encapsulated liquid crystals 11 ordinarily is required to construct a final liquid crystal device, such as the device 10' of FIG. 3, and since those encapsulated liquid crystals are in several layers, it is desirable to have a relatively high dielectric anisotropy in order to reduce the voltage requirements for the electric field E. More specifically, the differential between the dielectric constant (coefficient) for the liquid crystal material 20 when no electric field is applied which constant (coefficient) should be rather small, and the dielectric constant (coefficient) for the liquid crystal material when it is aligned upon application of an electric field, which constant (coefficient) should be relatively large, should be as large as possible.

The capsules 22 may be of various sizes. The smaller the capsule size, though, the higher the requirements will be for the electric field to effect alignment of the liquid crystal molecules in the capsule. Also, when the capsule size is relatively small, more capsules are required per unit area of the layer 34, and, therefore, more electric voltage drop losses will occur in the encapsulating medium than for larger size capsules, the density per unit area of which would be smaller. According to the preferred embodiment and best mode of the present invention, though, a device made with the encapsulated liquid crystals 11, such as the liquid crystal device 10', should use capsules of uniform size parameters so that the device 10' can be energized or deenergized in a relatively uniform and well controlled manner. In contrast, when the capsules are of a non-uniform size, then non-uniform energization of the respective capsules, i.e. alignment of the liquid crystal molecules of each, would occur upon application of the electric field. Ordinarily the capsules 22 should have a size on the order of from about 2 to about 25 microns in diameter.

As was noted above, the larger the capsule size, the smaller the electric field required to effect alignment of the liquid crystal molecules therein. However, the larger the sphere, the longer the response time.

Regardless of the capsule size and the particular field off arrangement of liquid crystal molecules within the capsule 22, it is important to know what the field off alignment would be and what would be the distorted alignment when there is a field on condition so that the encapsulated liquid crystals 11 may be used effectively.

In the preferred embodiment and best mode of the present invention the liquid crystal material used in the encapsulated liquid crystal 11 is of the nematic type.

Currently a most preferred liquid crystal material is that sold as nematic material NM8250 by American Liquid Xtal Chemical Corp., Kent, Ohio, U.S.A. Others may be ester combinations, biphenyl combinations, and the like.

The encapsulating medium forming respective capsules 22 should be of a type that is substantially completely unaffected by and does not affect the liquid crystal material. The other characteristics described above concerning dielectric constants (coefficients) and indices of refraction with respect to the liquid crystal material and to the encapsulating medium also constrain material selection. Moreover, when pleochroic dye is employed, the encapsulating medium also should be totally unaffected by and should not affect the dye material. On the other hand, the dye should be oil soluble and not subject to absorption by the water phase (see below) or polymer phase of the encapsulating medium. Additionally, to achieve the desired relatively high impedance for the encapsulating medium, such medium should have a relatively high level of purity.

An example of a pleochroic dye that may be used in the encapsulated liquid crystals 11 in accordance with the present invention are indophenol blue, Sudan black B, Sudan 3, and Sudan 2.

Various resins and/or polymers may be used as the encapsulating medium. However, an encapsulating medium according to the preferred embodiment and best mode of the present invention is polyvinyl alcohol (PVA), which has been found to have the desired properties mentioned above, especially in relation to the above described preferred liquid crystal and pleochroic dye material. Specifically, PVA has a good, relatively high, dielectric constant and has an index of refraction that is relatively closely matched to that of the preferred liquid crystal material.

To purify PVA, the same may be dissolved in water and washed out with alcohol using a precipitate technique. Other techniques also may be used for purifying PVA so that it will have minimum salt or other content that would reduce appreciably the electrical impedance thereof. The preferred purified PVA is SA72 sold by American Liquid Xtal Chemical Corp. If PVA is properly cleaned or purified, as aforesaid, it will serve well as its own emulsifier and as a wetting agent for facilitating the method of making encapsulated liquid crystals which will be described below. Other types of encapsulating medium may be, for example, gelatin, Carbopole, Gantrez, the latter two being polyelectrolytes; and these media may be used alone or in combination with other polymers, such as PVA. The wetting ability of the PVA also assists in allowing freedom of movement of the liquid crystal molecules in the respective capsules 22 facilitating the preferred parallel alignment especially at the interior wall surface 50 in the field off condition and easy changing to the aligned position of FIG. 6 when an electric field is applied.

A method for making encapsulated liquid crystals 11 may include mixing together the encapsulating medium, the liquid crystal material (including, if used, the pleochroic dye material), and perhaps a carrier medium, such as water. Mixing may occur in a variety of mixer devices, such as a blender, a colloid mill, which is most preferred, or the like. What occurs during such mixing is the formation of an emulsion of the ingredients, which subsequently can be dried eliminating the carrier medium, such as water, and satisfactorily curing the encapsulating medium, such as the PVA. Although the capsule 22 of each thusly made encapsulated liquid crystal 11 may not be a perfect sphere, each capsule will be substantially spherical in configuration because a sphere is the lowest free energy state of the individual droplets, globules or capsules of the emulsion, both when originally formed and after drying and/or curing has occurred.

It is noted here briefly that the characteristic of the pleochroic dye that it must be oil soluble provides for solution thereof with the liquid crystal material and that it not be subject to absorption by the water phase or polymer phase assures that such pleochroic dye will not be absorbed by the PVA or other encapsulating medium or by the carrier medium, such as the water, used during the manufacturing process for the encapsulated liquid crystals 11.

EXAMPLE I

A 0.45% Sudan black B pleochroic dye was dissolved in a liquid crystal which was composed of aromatic esters. Such combined material is commercially sold under the designation 8250 by American Liquid Xtal Chemical Corp. of Kent, Ohio. Such material was mixed with a solution of 7% PVA, which was treated to remove all salts. The solution also was made with ASTM-100 water. The resulting mixture was put into a colloid mill whose conegap setting was 4 mills, and the material was milled for four minutes to give a rather uniform particle suspension size. The result was a stable emulsion whose suspended particle size was approximately 3 microns. The emulsion was cast on a Mylar film which was precoated with a 200 ohm per square inch layer of tin oxide electrode purchased from Sierracin. A doctor blade was used to cast the emulsion material on the Mylar film on the electrode coated side.

A 7 mil lay-down of the emulsion material was placed on such electrode and was allowed to dry to a total thickness of 0.8 mil. A second layer of such emulsion subsequently was layed on the first with a resulting aggregate layer of liquid crystal droplets in a polyvinyl alcohol matrix having a thickness of 1.6 mil. Preferably, though, the encapsulated liquid crystals may be laid down in a single layer one or plural capsules thick.

The thusly formed liquid crystal device, including the layer of Mylar, electrode, and encapsulated liquid crystals then was tested by applying an electric field, whereupon the material changed from black to nearly clear-transparent. The material exhibited a very wide viewing angle, i.e. the angle at which light was transmitted, and the contrast ratio was 7:1 at 50 volts of applied electric field. The switching speed was about two milliseconds on and about 4 milliseconds off.

In accordance with the present invention the quantities of ingredients for making the encapsulated liquid crystals 11, for example in the manner described above, may be, as follows:

The liquid crystal material

This material may be from about 5% to about 20% and preferably about 10%, including the pleochroic dye, by volume of the total solution delivered to the mixing apparatus, such as the colloid mill. The actual amount of liquid crystal material used, thoug, odinarily should exceed the volume quantity of encapsulating medium, e.g. PVA to optimize the capsule size.

The PVA

The quantity of PVA in the solution should be on the order of from about 5% to about 20% and preferably, as was described above, about 7%, this depending, though, on the molecular weight of the PVA. For example, if the PVA has too large a molecular weight, the resulting material will be like glass, especially if too much PVA is used in the solution. On the other hand, if the molecular weight is too low, use of too little PVA will result in too low a viscosity of the material, and the resulting emulsion wll not hold up well, nor will the droplets of the emulsion solidify adequately to the desired spherical encapsulated liquid crystals.

Carrier medium

The remainder of the solution would be water or other carrier medium, as described above, with which the emulsion can be made and the material laid down appropriately on a substrate, electrode or the like.

It will be appreciated that since the uncured capsules or droplets of encapsulating medium and liquid crystal material are carried in a liquid, various conventional or other techniques may be employed to grade the capsules according to size so that the capsules can be re-formed if of an undesirable size by feeding again through the mixing apparatus, for example, and so that the finally used capsules will be of a desired uniformity for the reasons expressed above.

Although the presently preferred invention operates in response to application and removal of an electric field, operation also may be effected by application and removal of a magnetic field.

I claim:

1. A liquid crystal apparatus, comprising liquid crystal material having positive dielectric anisotropy, and surface means for affecting the natural structure of said liquid crystal material to induce a distorted alignment thereof in the absence of an electric field to reduce optical transmission independent of polarization, said liquid crystal material being responsive to the presence of an electric field to increase such optical transmission.

2. A liquid crystal apparatus, comprising liquid crystal material having positive dielectric anisotropy, surface means for affecting the natural structure of said liquid crystal material to induce a distorted alignment thereof in the absence of an electric field to reduce optical transmission independent of polarization, said liquid crystal material being responsive to the pesence of an electric field to increase such optical transmission, and pleochroic dye contained in said liquid crystal material.

3. An electro-optic display comprising the apparatus of claim 1 or 2, and further comprising electrical means for applying such electric field.

4. Liquid crystal material and a medium for containing discrete quantities of said liquid crystal material, said material having positive dielectric anisotropy, said medium having dielectric constant that is no less than the lower dielectric constant value of said material, and wherein when exposed to an electric field the electrical impedance of said medium and liquid crystal material exposed to such field along an electrical path through both said medium and liquid crystal material are related such that the electrical impedance of said medium is less than the electrical impedance of said liquid crystal material exposed to such field.

5. An electro-optic display comprising the material of claim 4, and further comprising electrical means for applying such electric field.

6. Liquid crystal material and a medium for containing discrete quantities of said liquid crystal material, said material having positive dielectric anisotropy, said medium having a dielectric constant that is no less than the lower dielectric constant value of said material, wherein said medium is an encapsulating medium for said liquid crystal material, and wherein said liquid crystal material and said encapsulating medium have electrical properties such that upon application of an electric field across a capsule along an electrical path through said encapsulating medium and liquid crystal material there is a greater voltage drop across said liquid crystal material than across said encapsulating medium.

7. An electro-optic display comprising the material and medium of claim 4 or 6, and further comprising electrical means for applying such electric field.

8. A material comprising a containment medium having an index of refraction, and optically anisotropic liquid crystal means contained in said containment medium and having an ordinary index of refraction in the presence of an electric field substantially equal to the index of refraction of said containment medium for maximizing optical transmission in the presence of an electric field.

9. A method of making encapsulated nematic liquid crystals, comprising mixing at least an encapsulating medium, a nematic liquid crystal material, and a pleochroic dye.

10. A method of making encapsulated nematic liquid crystals, comprising mixing at least an encapsulating medium and a nematic liquid crystal material, and further comprising selecting such liquid crystal material and such encapsulating medium such that the liquid crystal material has a positive dielectric anisotropy and the dielectric constant of such encapsulating medium is at least as great as the lower dielectric constant of such liquid crystal material.

11. The method of claim 10, said selecting further comprising selecting such liquid crystal material and such encapsulating medium such that the liquid crystal material has an ordinary index of refraction substantially the same as the index of refraction of the encapsulating medium.

12. A method of making encapsulated nematic liquid crystals, comprising mixing at least an encapsulating medium and a nematic liquid crystal material, and further comprising selecting such liquid crystal material and such encapsulating medium such that the liquid crystal material has an ordinary index of refraction substantially the same as the index of refraction of the encapsulating medium.

13. The method of claim 12, further comprising selecting such liquid crystal material and encapsulating medium such that the liquid crystal material has an extraordinary index of refraction that is different from the index of refraction of the encapsulating medium.

14. A method of making encapsulated nematic liquid crystals, comprising mixing at least an encapsulating medium and a nematic liquid crystal material, and further comprising causing such liquid crystal material to perform substantially independently of the optical polarization direction of incident light, including confining such liquid crystal material in a capsule formed by such encapsulating medium that causes distortion of the direction of the liquid crystal molecules when no electric field is applied thereto.

15. The method of claims 9, 10, 12 or 14, wherein such encapsulating medium comprises polyvinyl alcohol.

16. The method of claims 9, 10, 12 or 14, further comprising mixing a carrier material with such encapsulating medium and liquid crystal material to form an emulsion therewith, such liquid crystal material and encapsulating medium being insoluble in such carrier material.

17. The method of claim 16, further comprising removing such carrier material from such emulsion and curing such encapsulating medium.

18. The method of claim 17, such carrier material comprising water, and said removing comprising drying.

19. The method of claim 16, said mixing further comprising mixing in a colloid mill to obtain particles suspended in such emulsion of substantially uniform size.

20. The method of claim 16, further comprising forming capsules from such emulsion of a size on the order of from about 2 microns to about 25 microns.

21. The method of claim 14, the nematic liquid crystal material comprising from about 5 to about 20% by volume, the encapsulating medium comprising from about 5 to about 20% by volume, and the remainder of the material mixed comprising water.

22. The method of claims 9, 10, 12 or 14, said encapsulating medium forming plural capsules of such nematic liquid crystal material, and further comprising applying the plural capsules of such encapsulated liquid crystal material to a substrate or to an electrode thereof.

23. The method of claim 22, further comprising applying a further electrode on the side of the encapsulated liquid crystal material relatively remote from such substrate.

24. The method of claim 23, further comprising applying a protective coating over such second mentioned electrode.

25. The method of claim 23, further comprising forming at least one of such electrodes in a preestablished pattern and forming both of such electrodes to be substantially optically transparent to electromagnetic radiation in at least a portion of the visible range.

26. A method of causing nematic liquid crystal material to perform substantially independently of the optical polarization direction of incident light, comprising confining such nematic liquid crystal material in a capsule which causes distortion of the direction of the liquid crystal material.

27. An article made in accordance with the preceding claim.

28. A method of causing liquid crystal material to perform substantially independently of the optical polarization direction of incident light, comprising combining pleochroic dye with the liquid crystal material and confining such dyed liquid crystal material as a suspension in a confining medium.

29. Liquid crystal apparatus, comprising liquid crystal material, and containment means for inducing a distorted alignment of said liquid crystal material which in response to such alignment at least one of scatters and absorbs light and which in response to a prescribed input reduces the amount of such scattering or absorption.

30. The invention of claim 29, said liquid crystal material consisting essentially of nematic liquid crystal material.

31. The invention of claim 30, said liquid crystal material comprising nematic NM8250 liquid crystal material.

32. The invention of claim 29, said liquid crystal material being reversible.

33. The invention of claim 29, wherein such containment means forms a capsule containing such liquid crystal material, and wherein the size of such capsules is from about 2 microns to about 25 microns.

34. The invention of claim 29, said containment means comprising resin or polymer.

35. The invention of claim 34, said containment means being selected from the group comprising gelatin, Carbopole, Gantrez and polyvinyl alcohol.

36. The invention of claim 35, said containment means comprising polyvinyl alcohol.

37. The invention of claim 29, wherein said containment means forms a generally spherical capsule for containing such liquid crystal material.

38. The invention of claim 37, wherein the dielectric constant of the wall of such capsule results in a capacitance in a radial direction that does not drop the voltage appreciably relative to the voltage drop across the liquid crystal material upon application of an electric field across the capsule.

39. The invention of claim 23, said containment means comprising a containment medium that tends to align at least some of the liquid crystal material generally parallel to a wall of such medium when in the absence of an electric field.

40. The invention of claim 29, said containment means comprising an encapsulating medium that distorts the internal structure of the liquid crystal material in the absence of an electric field.

41. The invention of claim 29, further comprising substrate means for supporting the combination of said liquid crystal material and containment means.

42. The invention of claim 41, further comprising means for adhering the combination of said liquid crystal material and containment means to said substrate means.

43. The invention of claim 41, further comprising electrode means on said substrate means for applying an electric field to said liquid crystal material.

44. The invention of claim 43, further comprising means for adhering the combination of said liquid crystal material and containment means to said electrode means.

45. The invention of claim 29, said containment means forming discrete curved volumes containing discrete quantities of liquid crystal material, and said distorted alignment comprising alignment at least partly paralleling the curvature of such volumes.

46. The invention of claim 29, said liquid crystal material having positive dielectric anisotropy.

47. The invention of claim 29, said liquid crystal material having optical anisotropy.

48. The invention of claim 29, the combination of said liquid crystalmaterial and containment means forming a plurality of encapsulated liquid crystals, and further comprising substrate means for supporting said plurality of encapsulate liquid crystals.

49. The invention of claim 29, further comprising electrode means for applying an electrical field to said liquid crystal material as such prescribed input.

50. The invention of claim 49, further comprising circuit means for applying electrical energy to said electrode means to enable the same to apply such electric field.

51. The invention of claim 29, wherein such prescribed input is an electric field, and further comprising means for applying such electric field to such liquid crystal material.

52. The apparatus of claim 29, further comprising pleochroic dye in combination with said liquid crystal material.

53. The apparatus of claim 29, said liquid crystal material and containment means being cooperative at least one of to absorb and to scatter light independently of the polarization of the light incident thereon.

54. The apparatus of claim 29, said liquid crystal material and said containment means having substantially matched indices of refraction in the presence of such prescribed input.

55. The apparatus of claim 54, said liquid crystal material and said containment means having different indices of refraction in the absence of such prescribed input.

56. The apparatus of claim 29, wherein such prescribed input is an electric field, and said liquid crystal material and said containment means have substantially related dielectric constants in the presence of an electric field such that the electrical impedance of the containment means exposed to such field is less than the electrical impedance of the liquid crystal material exposed to such field.

57. The apparatus of claim 56, wherein said liquid crystal material and said containment means have substantially related dielectric constants in the presence of an electric field such that there is a greater voltage drop across the liquid crystal material than across the containment means.

58. The apparatus of claim 27, wherein such prescribed input is an electric field, and said liquid crystal material and said containment means have substantially related dielectric constants in the presence of an electric field such that there is a greater voltage drop across the liquid crystal material than across the containment means.

59. The invention of clim 29, said containment means comprising means for containing discrete quantities of such liquid crystal material causing the structure of such material to fold in on itself creating storage of elastic energy in such structure.

60. Liquid crystal material and a medium for containing discrete quantities of said liquid crystal material, said liquid crystal material having positive dielectric anisotropy, and wherein when exposed to an electric field the electrical impedance of said medium and liquid crystal material exposed to such field along an electrical path through both said medium and liquid crystal material are related such that the electrical impedance of said medium is less than the electrical impedance of said liquid crystal material exposed to such field.

61. Liquid crystal material and a medium for containing discrete quantities of said liquid crystal material, said liquid crystal material having positive dielectric anisotropy, wherein said medium is an encapsulating medium for said liquid crystal material, and wherein said liquid crystal material and said encapsulating medium have electrical properties such that upon application of an electric field across a capsule along an electrical path through said encapsulating medium and liquid crystal material there is a greater voltage drop across said liquid crystal material than across said encapsulating medium.

62. Liquid crystal material and a medium for containing discrete quantities of such liquid crystal material, said material having positive dielectric anisotropy, and mixed with the liquid crystal material a pleochroic dye that is soluble in the liquid crystal material.

63. The invention of claim 62, said pleochroic dye being selected from the group consisting of indophenol blue, Sudan black, Sudan 3 and Sudan 2.

64. Liquid crystal material and a medium for containing discrete quantities of such liquid crystal material, said material having positive dielectric anisotropy, said liquid crystal material having an ordinary index of refraction substantially the same as the index of refraction of said medium.

65. The invention of claim 64, said liquid crystal material having an extraordinary index of refraction that is different from the index of refraction of said medium.

66. Liquid crystal material and a medium for containing discrete quantities of such liquid crystal material, said material having positive dielectric anisotropy, said liquid crystal material comprising nematic liquid crystal material, and said medium comprising means for aligning the liquid crystal material to achieve a substantially maximum absorption of light energy under a no field condition.

67. The invention of claim 66, further comprising pleochroic dye in said liquid crystal material.

68. Liquid crystal material and a medium for containing discrete quantities of said liquid crystal material, said material comprising nematic liquid crystal material having positive dielectric anisotropy, said medium having a dielectric constant that is no less than the lower dielectric constant value of said material.

69. The invention of claims 27, 60, 61, 62, 64, or 68, said liquid crystal material consisting essentially of nematic liquid crystal material.

70. The combination of nematic liquid crystal material contained in a generally spherical capsule of encapsulating medium, said encapsulating medium having a wall, and wherein the ordinary index of refraction of said liquid crystal material is approximately the same as the index of refraction of the encapsulating medium.

71. The invention of claims 27, 60, 61, 62, 64, 68, 70 or 29, said liquid crystal material consisting substantially of operationally nematic liquid crystal material.

72. The invention of claims 27, 60, 61, 62, 64, 68 or 70, further comprising means for applying an electric field to said liquid crystal material to affect the alignment thereof and at least one of the absorbence and scattering of light thereby.

73. The invention of claim 72, said means for applying comprising electrode means for applying the electric field across said liquid crystal material.

74. The invention of claim 73, said means for applying further comprising circuit means for providing electrical energy to said electrode means to create such electric field.

75. The invention of claim 70, wherein the extraordinary index of refraction of such liquid crystal material is different from the index of refraction of the encapsulating medium.

76. The invention of claim 75, wherein said encapsulating medium aligns the liquid crystal material substantially parallel to at least a portion of the direction of a proximate wall portion of such encapsulating medium, thereby distorting the internal structure of the liquid crystal material.

77. Liquid crystal material and a medium for containing discrete quantities of such liquid crystal material, said material comprising an operationally nematic material having positive dielectric anisotropy, and said medium comprising means for tending physically to align said liquid crystal material with respect to said medium, said medium comprising encapsulating means for substantially encapsulating said material in substantially spherical capsules, and said means for tending physically to align comprising wall means of said capsules for tending to align said liquid crystal material generally in parallel with said wall means in the absence of an electric field.

78. An operationally nematic liquid crystal material and a containment means for containing discrete quantities of such liquid crystal material causing said material to fold in on itself creating storage of elastic energy in said material.

79. A display device comprising a substrate and supported thereby encapsulated liquid crystal which is operationally nematic and has a positive dielectric anisotropy.

80. The device of claim 79, said encapsulated liquid crystal comprising plural encapsulated liquid crystals, each capsule including liquid crystal material and an encapsulating medium, electrode means for applying an electric field across at least some of said encapsulated liquid crystals, and means for adhering said encapsulated liquid crystal to at least one of said electrode means and said substrate.

81. A liquid crystal apparatus comprising an operationally nematic liquid crystal material contained in discrete quantities by a matrix formed of an emulsion of such liquid crystal material and a further medium.

82. A display device formed of the liquid crystal apparatus of claim 81.

83. The invention of claims 27, 70, 78, 81, or 82, said liquid crystal material having positive dielectric anisotropy.

84. Liquid crystal apparatus, comprising liquid crystal material, and containment means for inducing a distorted alignment of said liquid crystal material which in response to such alignment absorbs light and which in response to a prescribed input reduces the amount of such absorption.

85. The invention of claim 84, said liquid crystal material having positive dielectric anisotropy.

86. The invention of claim 84, further comprising substrate means for supporting the combination of said liquid crystal material and containment means.

87. The invention of claim 86, further comprising means for adhering the combination of said liquid crystal material and containment means to said substrate means.

88. The invention of claim 86, further comprising electrode means on said substrate means for applying an electric field to said liquid crystal material.

89. The invention of claim 88, further comprising means for adhering the combination of said liquid crystal material and containment means to said electrode means.

90. The invention of claim 84, said containment means forming discrete curved volumes containing discrete quantities of liquid crystal material, and said distorted alignment comprising alignment at least partly paralleling the curvature of such volumes.

91. The invention of claim 84, said liquid crystal material having positive dielectric anisotropy.

92. The invention of claim 84, said liquid crystal material having optical anisotropy.

93. The invention of claim 84, the combination of said liquid crystal material and containment means forming a plurality of encapsulated liquid crystals, and further comprising substrate means for supporting said plurality of encapsulated liquid crystals.

94. The invention of claim 84, further comprising electrode means for applying an electrical field to said liquid crystal material as such prescribed input.

95. The invention of claim 94, further comprising circuit means for applying electrical energy to said electrode means to enable the same to apply such electric field.

96. The invention of claim 84, wherein such prescribed input is an electric field, and further comprising means for applying such electric field to such liquid crystal material.

97. The apparatus of claim 84, further comprising pleochroic dye in combination with said liquid crystal material.

98. The apparatus of claim 84, said liquid crystal material and containment means being cooperative to absorb light independently of the polarization of the light incident thereon.

99. The apparatus of claim 84, said liquid crystal material and said containment means having substantially matched indices of refraction in the presence of such prescribed input.

100. The apparatus of claim 99, said liquid crystal material and said containment means having different indices of refraction in the absence of such prescribed input.

101. The apparatus of claim 84, wherein such prescribed input is an electric field, and said liquid crystal material and said containment means have substantially related dielectric constants in the presence of an electric field such that the electrical impedance of the containment means exposed to such field is less than the electrical impedance of the liquid crystal material exposed to such field.

102. The apparatus of claim 84, wherein such prescribed input is an electric field, and said liquid crystal material and said containment means have substantially related dielectric constants in the presence of an electric field such that there is a greater voltage drop across the liquid crystal material than across the containment means.

103. The invention of claim 84, said liquid crystal material consisting substantially of operationally nematic liquid crystal material.

104. A liquid crystal device comprising liquid crystal material and containment means, said containment means forming a plurality of capsules each having a curved interior wall surface, said capsules containing said liquid crystal material; which liquid crystal material in the absence of an applied electric field at least one of scatters or absorbs incident light independently of the polarization of said light, and which device in the presence of an applied electric field displays decreased scattering or absorption at least in the direction of the applied electric field.

105. The device of claim 104 wherein the liquid crystal material consists essentially of nematic liquid crystal material having a positive dielectric anisotropy.

106. The device of claim 104 wherein the liquid crystal material contains a pleochroic dye.

107. The device of claim 104 wherein the liquid crystal material is optically anisotropic and the ordinary refractive index of the liquid crystal is substantially the same as the refractive index of the containment means.

108. The device of claim 104 which further comprises electrodes for applying such electric field.

109. The device of claim 108 which further comprises a substrate means for supporting said electrodes, liquid crystal material and containment means.

110. The device of claim 108 which further comprises circuit means for energizing said electrodes to apply such electric field.

111. Liquid crystal apparatus, comprising nematic liquid crystal material having positive dielectric anisotropy, and a plurality of containment means with curved surfaces for inducing a distorted alignment of said liquid crystal material which in response to such distortion at least one of scatters and absorbs light when pleochroic dye is present in the liquid crystal material and which in response to a prescribed input reduces the amount of such scattering or absorption.

* * * * *